United States Patent [19]

Watanabe et al.

[11] Patent Number: 4,812,489

[45] Date of Patent: Mar. 14, 1989

[54] ULTRAVIOLET-CURING RESIN COMPOSITION

[75] Inventors: Hideo Watanabe, Yugawaramachi; Yoshinobu Ohashi, Odawara, both of Japan

[73] Assignee: The Yokohama Rubber Co., Ltd., Tokyo, Japan

[21] Appl. No.: 149,303

[22] Filed: Jan. 28, 1988

Related U.S. Application Data

[63] Continuation-in-part of Ser. No. 749,349, Jun. 24, 1985, abandoned, and a continuation-in-part of Ser. No. 749,350, Jun. 24, 1985, abandoned.

[30] Foreign Application Priority Data

Jun. 30, 1984 [JP] Japan .................................. 59-135864
Jun. 30, 1984 [JP] Japan .................................. 59-135865

[51] Int. Cl.$^4$ ..................... C08F 2/50; C08F 20/28; C08F 20/36
[52] U.S. Cl. .................................. 522/42; 350/96.33; 350/96.34; 522/21; 522/44; 522/47; 522/96; 522/68; 522/97; 525/920; 526/301
[58] Field of Search ..................... 522/42, 44, 47, 96, 522/68, 97

[56] References Cited

U.S. PATENT DOCUMENTS 4,309,526 1/1982 Baccei .................................. 528/75
4,526,920 7/1985 Sakashita .............................. 526/261

FOREIGN PATENT DOCUMENTS 92947 5/1984 Japan .
1147 3/1985 PCT Int'l Appl. .

OTHER PUBLICATIONS

Chemical Abstracts, vol. 101, No. 24, Abstract No. 215389y, 1984.

Primary Examiner—John C. Bleutge
Assistant Examiner—A. H. Koeckert
Attorney, Agent, or Firm—Armstrong, Nikaido, Marmelstein & Kubovcik

[57] ABSTRACT

An ultraviolet-curing resin composition comprising an acrylic oligomer, tris(2-hydroxyethyl)isocyanurate triacrylate, a reactive diluent and a photopolymerization initiator, wherein the acrylic oligomer is a urethane obtained from diphenylmethane diisocyanate, a polytetramethylene glycol having a molecular weight of 650 to 1,300 and a monoacrylate having a hydroxy group, the amount of tris(2-hydroxyethyl)isocyanurate triacrylate is 1 to 100 parts by weight for 100 parts by weight of the urethane acrylate, and the reactive diluent is an acrylic monomer. A mixture of tris(2-hydroxyethyl)isocyanurate triacrylate and a terminal diacrylate having a cycloacetal group may be used in place of tris(2-hydroxyethyl)isocyanurate triacrylate. The compositions are useful as secondary cladding materials and buffer materials in optical fiber units.

15 Claims, No Drawings

ULTRAVIOLET-CURING RESIN COMPOSITION

This is a continuation-in-part of U.S. patent application Ser. No. 749,349, filed June 24, 1985 and Ser. No. 749,350, filed June 24, 1985, now both abandoned.

BACKGROUND

The present invention relates to ultraviolet-curing resin compositions, and more particularly, to ultraviolet-curing resin compositions suitable for use as secondary cladding materials for a core of an optical fiber and as buffer materials for optical fiber units.

Optical fibers are comprised of a core and a sheath formed around the core. The core and sheath are formed from two kinds of glass or two kinds of plastic, each having a different refractive index. One or more cladding layers is formed around the glass or plastic core. The primary cladding layer is formed directly on the core. A secondary cladding may be formed directly around the primary cladding or it may be produced by forming the secondary cladding on the primary cladding via a buffer layer.

Regardless of the structure, the secondary cladding typically is formed by extrusion-molding a thermoplastic resin, such as a polyamide or a polyethylene and, as a result, the drawing rate of the optical fiber core is limited. As a result, the mass production of optical fibers is limited.

Although the formation of a secondary cladding from an ultraviolet-curing resin composition has been proposed, no secondary cladding material having the combination of satisfactory modulus of elasticity, elongation and resistance to moist heat has been found.

Optical fibers are typically used in the form of optical fiber units, which are an assembly of optical fiber cores arranged around a central member with a buffer material separating the central member and the optical fiber cores. A copper wire is used as the central member and the clad glass or plastic fibers described above are the cores. Units or bundles of this type are particularly useful in communication cables.

Plastic yarns made from a thermoplastic resin have been used as the buffer material. Such yarns suffer from a low molding rate which makes manufacturing cost high. The use of an ultraviolet-curing resin as a buffer material has been proposed to increase the molding rate and to improve workability.

A secondary cladding material and a buffer material must be compatible, but their use requires that their physical properties be different. A secondary cladding material must have a pressure resistance sufficient to protect the first cladding material. When the modulus of elasticity is too low, i.e., below 25 kg/mm$^2$, the cladding does not impart sufficient strength to the fiber and the fiber is easily broken. When the modulus is too high, i.e., greater than 75 kg/mm$^2$, there is insufficient shock absorption. In addition, the cladding must be sufficiently flexible so as not to break when tension or bending force is applied. An elongation of at least 15% is required.

A buffer material must be softer and more flexible than the secondary cladding material. Its primary function is to absorb shock, and, therefore, a modulus of elasticy between 1 and 25 kg/mm2 is desired. The buffer material must have an elongation of at least 40% to allow the cable bundle to be routed through ducts and around corners.

However, the ultraviolet-curing resin compositions used to date have poor moisture resistance, elongation and elasticity, although it does have an improved workability. No buffer material comprising an ultraviolet-curing resin composition which satisfies all of the above requirements has been found yet.

For example, an epoxy acrylate composition has a defect that its modulus of elasticity is too high and elongation is insufficient.

Urethane acrylate compositions have a problem that its resistance to moist heat and its photo-curing rate are low.

SUMMARY

An object of the present invention is to provide ultraviolet-curing resin compositions having an excellent resistance to moist heat, and having a modulus of elasticity and elongation within ranges suitable tor the purpose. The compositions are suitable for use as a secondary cladding material or as a buffer material for optical fiber units, depending upon the ratios of components used, and allow improvement in the mass production of optical fibers.

THE PREFERRED EMBODIMENTS

The photo-curing resin compositions of the present invention comprises an acrylic oligomer, either tris(-2hydroxyethyl)isocyanurate triacrylate (hereinafter referred to as THEIC-TA) either alone or in a mixture with a terminal diacrylate having a cycloacetal group, a reactive diluent and a photopolymerization initiator.

The acrylic oligomers include urethane acrylates obtained from diphenylmethane diisocyanate, a polytetramethylene glycol having a molecular weight of 650 to 1,300 and a monoacrylate having a hydroxy group. The urethane acrylate (I) is obtained by reaction an urethane prepolymer (IV) having a terminal NCO group obtained from diphenylmethane diisocyanate (II) and a polytetramethylene glycol (III) having a molecular weight of 650 to 1,300 with a monoacrylate (V) having a hydroxy group as shown in the following formulae:

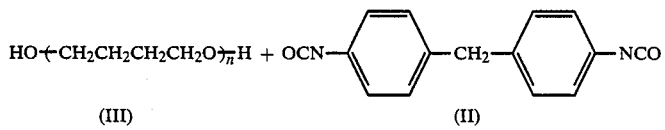

(III)      (II)

-continued

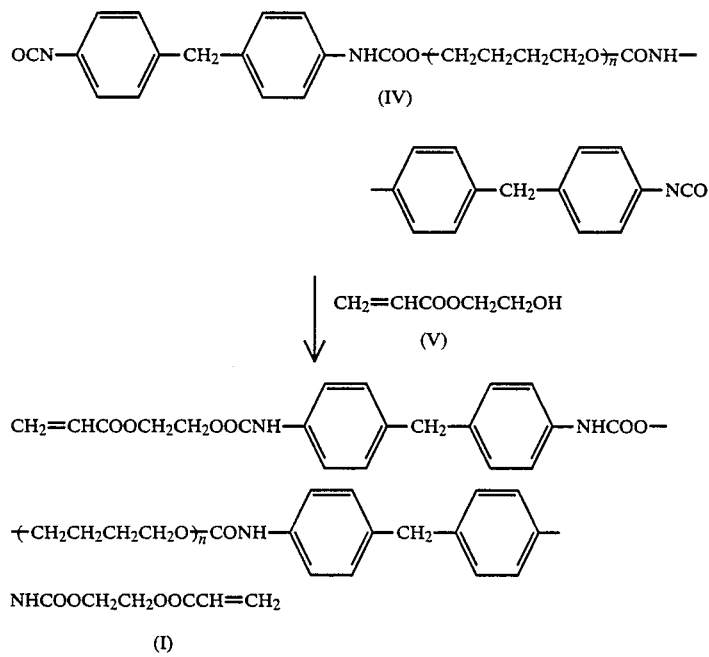

The diisocyanate used in the present invention is diphenylmethane diisocyanate (II) as described above which exerts excellent effects on the physical properties of the resulting resin composition. Urethane acrylates obtained from toluene diisocyanate have a modulus of elasticity lower than that of the urethane acrylate used in the present invention.

When a polytetramethylene glycol (III) having a molecular weight of 650 to 1,300 is used in the production of the urethane acrylate (I) according to the present invention, preferred effects are obtained on the physical properties of the materials for use in the optical fiber units.

For example, when a lactonepolyol is used in the production of urethane acrylate, only a poor U.V.-curability is obtained, while when polypropylene glycol or polyesterpolyol is used, only poor resistance to moist heat and resistance to water are obtained.

When polytetramethylene glycol (III) having a molecular weight in the range of 650 to 1,300 is used, the resulting resin composition has high and well-balanced elongation and modulus of elasticity.

Polytetramethylene glycol having a molecular weight of lower than 650 cannot be produced easily. When polytetramethylene glycol having a molecular weight of higher than 1,300 is used, the resulting resin composition has only a low modulus of elasticity and a poor elongation.

The monoacrylates (V) having a hydroxy group used according to the present invention include 2-hydroxyethyl acrylate and 2-hydroxypropyl acrylate.

THEIC-TA used in the present invention is represented by the following formula (1):

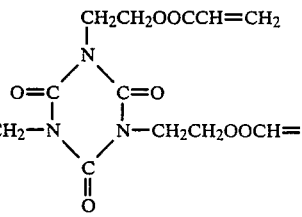

The amount of THEIC-TA which is used is critical to the control of the modulus of elasticity and the elongation of the cured resin. These properties, in turn, determine the preferred use of the resin in the optical fiber units. When the amount of THEIC-TA is 1 to 25 parts by weight, preferably 2 to 15 parts by weight, for 100 parts by weight of the urethane acrylate (I), the composition is suitable for use as a buffer material for the optical fiber units.

When the amount of THEIC-TA used is less than 1 part by weight, the cured resin composition will have a modulus of elasticity of less than 1 kg/mm$^2$, while when it exceeds 25 parts by weight, the composition will have a modulus of elasticity of higher than 25 kg/mm$^2$ and an elongation of less than 40% and become unsuitable as the buffer material for the optical fiber units.

However, when THEIC-TA is used alone, in an amount between 25 and 100 parts by weight, preferably 45–75 parts by weight, per 100 parts by weight of the urethane acrylate, the composition is suitable for use as a secondary cladding material. Such a composition has a modulus of elasticity of 25 kg/mm$^2$ or greater and an elongation of at least 15%. An amount of THEIC-TA greater than 25 parts by weight produces a cured composition with a modulus of less than 25 kg/mm$^2$ and an amount greater than 100 parts by weight produces a cured composition with an elongation less than 15%.

According to the present invention for a secondary cladding material, THEIC-TA (1) may be used either alone or in the form of a mixture thereof with a terminal diacrylate having a cycloacetal group in the molecule as shown by the following formula (2):

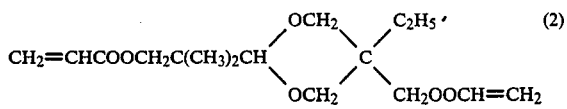

The amount of the mixture of THEIC-TA (1) and the terminal diacrylate of the above formula (2) is 30 to 70 parts by weight for 100 parts by weight of said urethane acrylate.

When the amount of this mixture is less than 30 parts by weight for 100 parts by weight of the urethane acrylate, the U.V.-cured resin composition will have a poor modulus of elasticity, while when it exceeds 70 parts by weight, the cured resin composition will have a poor elongation and the composition cannot be used as the secondary cladding material for the optical fiber core.

The weight ration of THEIC-TA (1) to the compound of the above formula (2) in the mixture is 5/2 to 1/6. When this ratio is higher than 5/2, the cure shrinkage increases, while when it is lower than 1/6, the elongation decreases to make the use of the composition as the secondary cladding material impossible.

The U.V.-curable reactive diluents used in the present invention include acrylic monomers, examples of which include isobutyl, t-butyl, 2-ethyhexyl, lauryl, stearyl, 2-hydroxyethyl, 2-hydroxypropyl, 2-methoxyethyl, 2-butoxyethyl, 2-phenoxyethyl, dicyclopentenyl and dicyclopentenyloxyethyl acrylates. Among then, the 2-phenoxyethyl and dicyclopentenyl acrylates are preferred.

These acrylic monomers may be used either alone or in the form of a mixture of two or more of them. They are used in an amount of 10 to 100 parts by weight per 100 parts by weight of the urethane acrylate.

When the amount of the acrylic monomer is less than 10 parts by weight, any good workability of the resin composition of the present invention cannot be obtained, while when it exceeds 100 parts by weight, any good workability and high modulus of elasticity cannot be obtained.

The photopolymerization initiators used in the present invention include benzoin ethyl ether, benzoin isopropyl ether, benzoin isobutyl ether, benzophenone, 4-methoxybenzophenone, 1-hydroxycyclohexyl phenyl ketone, benzil dimethyl ketal, benzil β-methoxyethyl acetal, methylbenzoin, acetophenone, 2,2-diethoxyacetophenone, diethylthioxanthone, 4-isopropyl-2-hydroxy-2-methyl-propiophenone, 2-hydroxy-2-methylpropiophenone and 2-methoxyanthraquinone. Among them, 1-hydroxycyclohexyl phenyl ketone and benzil dimethyl ketal are preferred.

The photopolymerization initiators may be used either alone or in the form of a mixture of two or more of them. They are used in an amount of 0.5 to 10 parts by weight for 100 parts by weight of the total of the above-mentioned urethane acrylate, THEIC-TA, terminal diacrylate having a cycloacetal group (if any) and reactive diluent.

When the amount of the photopolymerization initiator is less than 0.5 part by weight, the cure rate of the resin composition of the present invention is low while when it exceeds 10 parts by weight, not only the resistance to moist heat is reduced but also the cost of the resin composition is increased.

According to the present invention, a thermal polymerization inhibitor and a photosensitization assistant may be incorporated in the composition, if necessary.

The thermal polymerization inhibitors include hydroquinone, methoquinone, p-benzoquinone and tbutylhydroquinone. They are used in an amount of 0.001 to 1.0% based on the total of urethane acrylate, THEIC-TA and the reactive diluent.

The thermal polymerization inhibitors exhibit the effect of improving the thermal stability of the resin composition of the present invention during storage.

The photosensitizing assistants act as catalysts for accelerating the curing by UV rays. Examples include triethylamine, 2-dimethylaminoethanol, N-methyldiethanolamine, triethanolamine, 3-dimethylamino-1-propanol, 2-dimethylamino-1propanol, p-dimethylaminobenzoic acid, isoamyl p-dimethylaminobenzoate and methyl p-dimethylaminobenzoate.

As described above, the U.V. curing resin composition of the present invention comprises the acrylic oligomer, THEIC-TA, (or a mixture thereof with the terminal diacrylate having a cycloacetal group), the reactive diluent and the photopolymerization initiator. In this composition, the acrylic oligomer is a urethane acrylate obtained from diphenylethane diisocyanate, polytetramethylene glycol having a molecular weight of 650 to 1,300 and a monoacrylate having a hydroxy group. When THEIC-TA is used alone, the amount of THEIC-TA used is 1 to less than 25 parts by weight for 100 parts by weight of the urethane acrylate for materials used as a buffer material, or 25 to 100 parts by weight for 100 parts by weight of urethane acrylate when used as a secondary cladding material. When THEIC-TA is used as a mixture thereof with a terminal diacrylate having a cycloacetal group, for a secondary cladding material the total amount of THEIC-TA and terminal diacrylate is 30 to 70 parts by weight per 100 parts by weight of urethane acrylate. Further the reactive diluent is the acrylic monomer.

When an amount of THEIC-TA between 1 and 25 parts by weight per 100 parts by weight of an urethane acrylate is used, the composition is suitable for use as a buffer material and has the following properties:

A. The U.V. cured resin composition has excellent resistance to moist heat and resistance to water.
B. A modulus of elasticity of 1 to 25 kg/mm² is obtained. With the modulus of elasticity within this range, the resin composition of the present invention is useful as a preferred buffer material for optical fiber units.
C. The elongation is as high as at least 40% and is well-balanced with the value of modulus of elasticity mentioned in the above item B. This fact indicates that the resin composition of the present invention is suitable for use as the buffer material for optical fiber units.
D. A sufficient U.V.-cure rate can be obtained and a high workability is kept.
E. The resin composition of the present invention is closely adhered to the optical fiber core to exhibit an excellent waterstopping property.

When the amount of THEIC-TA is between 25 and 100 parts by weight per 100 parts by weight of urethane acylate, or when a mixture of THEIC-TA and isocyanurate triacylate is used in an amount of 30 to 70 parts by weight per 100 parts by weight of urethane acrylate, the material is suitable for use as a secondary cladding material and has the following properties:

A. The U.V.-cured resin composition has excellent resistance to moist heat and resistance to water.
B. A modulus of elasticity of 25 to 75 kg/mm² is obtained. Particularly when the mixture of THEIC-TA and the terminal diacrylate having a cycloacetal group in the molecule is used as the acrylate, the U.V.-cured resin composition has a modulus of elasticity of as high as 30 kg/mm².
C. The elongation is as high as at least 15% and is well-balanced with the value of modulus of elasticity mentioned in the above item B. This fact indicates that the resin composition of the present invention is suitable for use as the secondary cladding material for optical fiber cores.
D. The cure shrinkage is as low as up to 6.5%.
E. The U.V.-cure rate is low and, therefore a high workability can be maintained.

The measurement methods employed in the present invention are as follows:

Modulus of elasticity (kg/mm²): The modulus in torsion was determined by free damping method with TBA (torsional braid analyzer).

Elongation (%): The tests were conducted according to JIS K-7113. A dumbbell with indicators of 40 mm intervals was tensioned and the distances between the indicators were measured. The elongation at break was employed as the value of elongation. The tension rate was 50 mm/min and the measurement temperature was 25±0.5° C.

Elongation retention after standing for two weeks at 80° C. and 95% RH (%): A sample in the form of dumbbells was placed in a humidity controlled oven at 80° C. and 95% RH for two weeks. The sample was then taken out and its elongation was measured by the above-mentioned elongation-measuring method within 8 hours.

Cure shrinkage (%): The cure shrinkage was determined from the specific gravities of the cured and uncured products according to the following formula:

$$\frac{1/\rho_1 - 1/\rho_2}{1/\rho_1} \times 100$$

wherein $\rho_1$ represents a specific gravity of the uncured product and $\rho_2$ represents that of the cured product.

The specific gravity of the cured product was determined by displacement of water and that of the uncured product was determined by a pycnometer method (JIS K-7112).

Elongation retention after standing in water at 80° C. for two weeks: A sample in the form of dumbbells was immersed in water at 80° C. for two weeks. The sample was then taken out, water was wiped off from the surface thereof and its elongation was measured by the above-mentioned elongation-measuring method within 8 hours.

The following examples will further illustrate the present invention:

EXAMPLE 1: Preparation of urethane acrylate (I)

Two mols of diphenylmethane diisocyanate (II) was placed in a 3 four-necked flask provided with a stirrer, thermometer and dropping funnel. One mol of polytetramethylene glycol (III) having a molecular weight of 850 was added dropwise thereto while heating to 60° C. and stirring for 4 hours under a blanket of $N_2$ gas to carry out the reaction. A urethane prepolymer (IV) was thus obtained.

The completion of the reaction was confirmed by NCO analysis.

Then, two mol of 2-hydroxyethyl acrylate (V) was added dropwise and the reaction carried out for 6 hours to obtain an urethane acrylate (I).

The reaction product was analyzed by infrared spectrophotometry. No peak of NCO was observed.

EXAMPLES 2, 3, 5, 6, 7 AND 8 AND COMPARATIVE EXAMPLES 1, 2 and 3

A resin composition comprising the urethane acrylate prepared in Example 1 and various amounts of THEIC-TA, a reactive diluent and a photopolymerization initiator was cured by irradiation with UV rays and its modulus of elasticity, elongation and resistance to moist heat were examined.

The relationship between a change of the resin composition and physical properties thereof is shown in the following Table 1.

In Comparative Example 1, THEIC-TA was not used. In Comparative Example 2, the amount of THEIC-TA exceeded the range of the present invention. In Comparative Examples 3, a different urethane acrylate was used. The results of Comparative Examples 1, 2 and 3 are also shown in the following table:

TABLE 1

|  | Comp. Ex. 1 | Ex. 2 | Ex. 3 | Ex. 4 | Ex. 5 | Ex. 6 | Ex. 7 | Ex. 8 | Comp. Ex. 2 | Comp. Ex. 3 |
|---|---|---|---|---|---|---|---|---|---|---|
| Urethane acrylate | 100 | 100 | 100 | 100 | 100 | 100 | 100 | 100 | 100 | 100[4] |
| FA-731A[1] | — | 1.5 | 16 | 25 | 30 | 50 | 70 | 100 | 115 | 1.5 |
| POA[2] | 40 | 40 | 50 | 42 | 45 | 50 | 43 | 50 | 40 | 40 |
| Irgacure 184[3] | 7 | 7 | 8 | 8 | 9 | 10 | 11 | 12 | 13 | 7 |
| Modulus of elasticity (kg/mm²) | 0.8 | 1.5 | 15 | 25 | 30 | 40 | 56 | 75 | 100 | 1.2 |
| Elongation (%) | 60 | 59 | 48 | 41 | 36 | 29 | 23 | 15 | 7 | 56 |
| Elongation retention (%) after 2 weeks at 80° C. at 95% RH | 80 | 82 | 85 | 90 | 90 | 90 | 90 | 90 | 90 | 30 |

Notes:
[1]FA-731A: THEIC-TA [tris(2-hydroxyethyl) isocyanurate triacrylate]; a product of Hitachi Chemical Co., Ltd.
[2]POA: 2-phenoxyethyl acrylate (reactive diluent); a product of Kyoeisha Yushi Co., Ltd.
[3]Irgacure 184: 1-hydroxycyclohexyl phenyl ketone (photopolymerization initiator); a product of Ciba-Geigy.
[4]a urethane acrylate synthesized from 1 mol of polypropylene glycol (molecular weight: 1000), 2 mol of diphenylmethane diisocyanate and 2 mole of 2-hydroxyethyl acrylate.

It is apparent from Table 1 that the composition of the present invention may be controlled so that the properties of the cured material will have the modulus of elasticity and the elongation required for use as a secondary cladding material or as a buffer material for an optical fiber and, further, that the secondary cladding material and buffer material according to this invention would be compatible.

On the other hand, Comparative Example 1 has a modulus of elasticity and resistance to moist heat which is unsuitable for use with an optic fiber, Comparative Example 2 has an excessively high modulus of elasticity and a low elongation and is not suitable for either use. Comparative Example 3 has a poor resistance to moist heat, as a result of the use of a different acrylate.

EXAMPLES 9, 10, 11 AND 12 AND COMPARATIVE EXAMPLES 4 AND 5

A resin composition comprising the urethane acrylate prepared in Example 1, THEIC-TA of the above formula (1), a terminal diacrylate of the above formula (2), a reactive diluent and a photopolymerization initiator was cured by irradiation with UV rays and its modulus of elasticity, elongation and resistance to moist heat were examined.

The relationship between a change of the resin composition and physical properties thereof is shown in the following Table 2.

In Comparative Example 4, the total amount of THEIC-TA and terminal diacrylate was larger than 70 parts by weight for 100 parts by weight of the urethane acrylate. In Comparative Example 5, the total amount of THEIC-TA and terminal diacrylate was smaller than 30 parts by weight. The results of Comparative Examples 4 and 5 are also shown in Table 2.

TABLE 2

|  | Ex. 9 | Ex. 10 | Ex. 11 | Ex. 12 | Ex. 4 | Ex. 5 |
|---|---|---|---|---|---|---|
| Urethane acrylate | 100 | 100 | 100 | 100 | 100 | 100 |
| FA-731A[1] | 15 | 45 | 36 | 10 | 36 | 10 |
| R-604[2] | 15 | 18 | 27 | 55 | 36 | 10 |
| POA[3] | 33 | 27 | 18 | 18 | 9 | 28 |
| Irgacure 184[4] | 8 | 9 | 9 | 9 | 9 | 10 |
| Modulus of elasticity (kg/mm$^2$) | 30 | 51 | 48 | 44 | 51 | 18 |
| Elongation (%) | 35 | 20 | 18 | 16 | 13 | 44 |
| Cure Shrinkage (%) | 5.92 | 6.49 | 6.20 | 6.05 | 6.48 | 5.90 |
| Elongation retention after immersion in water at 80° C. for 2 weeks | no change | no change | no change | no change | no change | no change |

Notes:
[1]FA-731A: THEIC-TA [tris(2-hydroxyethyl) isocyanurate triacrylate]; a product of Hitachi Chemical Co., Ltd.
[2]R-604: the terminal diacrylate having cycloacetal group in the molecule as shown by the above formula 20; a product of NIPPON KAYAKU Co., Ltd.
[3]POA: 2-phenoxyethyl acrylate (reactive diluent); a product of Kyoeisha Yushi Co., Ltd.
[4]Irgacure 184: 1-hydroxycyclohexyl phenyl ketone (photopolymerization initiator); a product of Ciba-Geigy.

It is apparent from Table 2 that the resin compositions shown in Table 2 have a modulus of elasticity of at least 30 kg/mm$^2$ after the U.V.-curing, an elongation of at least 15%; a cure shrinkage of up to 6.5% and an excellent resistance to moist heat. They are, therefore, suitable for use as secondary cladding materials for optical fiber cores.

On the other hand, the resin in Comparative Example 4 had only a low elongation and that in Comparative Example 5 had a low modulus of elasticity. They are unsuitable for use as the secondary cladding materials.

We claim:

1. An ultraviolet-curing resin composition comprising an acrylic oligomer, tris(2-hydroxyethyl)isocyanurate triacrylate, a reactive diluent and a photopolymerization initiator, wherein said acrylic oligomer is an urethane acrylate obtained from diphenylmethane diisocyanate, a polytetramethylene glycol having a molecular weight of 650 to 1,300 and a monoacrylate having an hydroxy group, being selected from the group consisting of 2-hydroxyethyl acrylate and 2-hydroxypropyl acrylate, the amount of said tris(2-hydroxyethyl)isocyanurate triacrylate is 1 to 100 parts by weight per 100 parts by weight of said urethane acrylate and said reactive diluent is an acrylic monomer selected from the group. consisting of 2-phenoxyethyl acrylate, dicyclopentenyl acrylate and dicyclopentenyloxyethyl acrylate, and is present in an amount between 10 and 100 parts by weight per 100 parts urethane acrylate.

2. An ultraviolet-curing resin composition according to claim 1, wherein the amount of said tris(2-hydroxyethyl)isocyanurate triacrylate is 1 to 15 parts by weight per 100 parts by weight of urethane acrylate.

3. An ultraviolet-curing resin composition according to claim 1, wherein the amount of said tris (2-hydroxyethyl)isocyanurate triacrylate is 45 to 75 parts by weight per 100 parts by weight of urethane acrylate.

4. An ultraviolet-curing resin composition according to claim 1, wherein the acrylic monomer used as the reactive diluent is selected from the group consisting of 2-phenoxyethyl acrylate and dicyclopentenyl acrylate.

5. An ultraviolet-curing resin composition according to claim 1, wherein the photopolymerization initiator is selected from the group consisting of 1-hydroxycyclohexyl phenyl ketone and benzil dimethyl ketal.

6. An ultraviolet-curing resin composition according to claim 1, wherein the amount of photopolymerization initiator used is 0.5 to 10 parts by weight per 100 parts by weight of the total of said urethane acrylate, tris(2-hydroxyethyl)isocyanurate triacrylate and reactive diluent.

7. An ultraviolet-curing resin composition according to claim 1, further comprising a thermal polymerization inhibitor selected from the group consisting of hydroquinone, methoquinone, para-benzoquinone and tert-butylhydroquinone.

8. An ultraviolet-curing resin composition according to claim 7, wherein the amount of thermal polymerization inhibitor is used in an amount of $1 \times 10^{-3}$ to 1.0%, based on the total of said urethane acrylate, tris(2-hydroxyethyl)isocyanurate triacrylate and reactive diluent.

9. An ultraviolet-curing resin composition according to claim 1, further comprising a photosensitization assistant.

10. An ultraviolet-curing resin composition comprising:
(a) an acrylic oligomer;
(b) a mixture of tris(2-hydroxyethyl)isocyanurate triacrylate and the acrylic diester of 2(2-hydroxy-1,1-dimethylethyl)-5-hydroxymethyl-5-ethyl-1,3-dioxane having the formula (I)

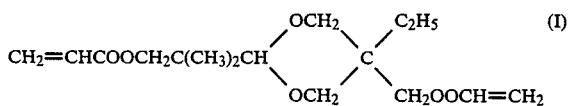

(c) a reactive diluent; and
(d) a photopolymerization initiator; wherein said acrylic oligomer is an urethane acrylate obtained from diphenylmethane diisocyanate, a polytetramethylene glycol having a molecular weight of 650 to 1,300, and a monoacrylate having a hydroxyl group selected from the group consisting of 2-hydroxyethyl acrylate and 2-hydroxypropyl acrylate, wherein said mixture of said tris(2-hydroxyethyl)isocyanurate triacrylate and said acrylic acid ester of 2(2-hydroxy-1,1-dimethylethyl)-5- hydroxymethyl-5-ethyl-1,3-dioxane is used in an amount of 30 to 70 parts by weight per 100 parts by weight of said urethane acrylate, and wherein said reactive diluent is an acryl monomer selected from the group consisting of 2-phenoxyethyl acrylate, dicyclopentenyl acrylate and dicyclopentenyloxyethyl acrylate and is present in an amount between 10 and 100 parts by weight per 100 parts urethane acrylate.

11. An ultraviolet-curing resin composition according to claim 10, wherein the weight ratio of said tris(2-hydroxyethyl)isocyanurate triacrylate to said compound of formula (I) is between 5:2 and 1:6.

12. An ultraviolet-curing resin composition according to claim 10, wherein said photopolymerization initiator is selected from the group consisting of 1-hydroxycyclohexyl phenyl ketone and benzil dimethyl ketal.

13. An ultraviolet-curing resin composition according to claim 12, wherein the amount of photopolymerization initiator used is 0.5 to 10 parts by weight per 100 parts by weight of the total of said urethane acrylate, tris(2-hydroxyethyl)isocyanurate triacrylate, compound of formula (I) and reactive diluent.

14. An ultraviolet-curing resin composition according to claim 1 further comprising a thermal polymerization inhibitor.

15. An ultraviolet-curing resin composition according to claim 10 further comprising a photosensitization assistant.

* * * * *